United States Patent
Yasunori

(10) Patent No.: US 11,405,233 B2
(45) Date of Patent: Aug. 2, 2022

(54) RELAY DEVICE SYSTEM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Hiromichi Yasunori, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/279,043

(22) PCT Filed: Sep. 18, 2019

(86) PCT No.: PCT/JP2019/036580
§ 371 (c)(1),
(2) Date: Mar. 23, 2021

(87) PCT Pub. No.: WO2020/066790
PCT Pub. Date: Apr. 2, 2020

(65) Prior Publication Data
US 2022/0006667 A1    Jan. 6, 2022

(30) Foreign Application Priority Data

Sep. 25, 2018   (JP) .............................. JP2018-179465

(51) Int. Cl.
*H04L 12/40*  (2006.01)
*H04B 3/36*   (2006.01)

(52) U.S. Cl.
CPC ......... *H04L 12/40006* (2013.01); *H04B 3/36* (2013.01); *H04L 2012/40273* (2013.01)

(58) Field of Classification Search
CPC .... H04L 12/40006; H04L 2012/40273; H04B 3/36
See application file for complete search history.

(56) References Cited

U.S. PATENT DOCUMENTS 9,524,160 B2 *  12/2016  Takahashi ............... G06F 13/00
10,764,084 B2 *  9/2020  Lee ..................... B60R 16/0315
(Continued)

FOREIGN PATENT DOCUMENTS

| CN | 104724007 A | 6/2015 |
| JP | 2007-336267 A | 12/2007 |
| JP | 2018-93370 A | 6/2018 |

OTHER PUBLICATIONS

International Search Report, Application No. PCT/JP2019/036580, dated Nov. 5, 2019. ISA/ Japan Patent Office.

*Primary Examiner* — Freshteh N Aghdam
(74) *Attorney, Agent, or Firm* — Honigman LLP

(57) ABSTRACT

A relay device system is a relay device system to be installed in a vehicle, the relay device system including a wireless relay device configured to wirelessly communicate with a communication device provided outside the vehicle, and a plurality of wired relay devices that are communicably connected to the wireless relay device, the plurality of wired relay devices each including a communication unit configured to communicably connect to an ECU for controlling an on-board device installed in the vehicle, the ECUs including an HMI-related ECU, a travel control-related ECU, and a self-driving-related ECU, the wired relay device that is connected to the HMI-related ECU and the wired relay device that is connected to the travel control-related ECU being arranged in a front portion of the vehicle, and the wired relay device that is connected to the self-driving-related ECU being arranged in a rear portion of the vehicle.

9 Claims, 8 Drawing Sheets

(56) References Cited

U.S. PATENT DOCUMENTS

| | | | | |
|---|---|---|---|---|
| 2009/0125162 A1* | 5/2009 | Matsuo | ............... | H04L 69/08 |
| | | | | 701/1 |
| 2010/0211676 A1* | 8/2010 | Takada | ............... | H04L 12/437 |
| | | | | 709/224 |
| 2017/0201584 A1 | 7/2017 | Endo | | |
| 2017/0369044 A1* | 12/2017 | Otake | ............... | B60T 7/14 |
| 2018/0176305 A1* | 6/2018 | Omori | ............... | H04L 67/125 |
| 2020/0145252 A1* | 5/2020 | Torisaki | ............... | H04L 12/40013 |

* cited by examiner

| ASIL level | Example of corresponding ECU |
|---|---|
| QM | HMI-related ECU, air conditioner ECU |
| ASIL-A | Body-related ECU such as door mirror control |
| ASIL-B | Travel control-related ECU related to driving control and the like |
| ASIL-C | Travel control-related ECU related to braking control or the like |
| ASIL-D | Self-driving-related ecu related to self-driving control |

RELAY DEVICE SYSTEM

CROSS-REFERENCE TO RELATED APPLICATIONS

This application is the U.S. national stage of PCT/JP2019/036580 filed on Sep. 18, 2019, which claims priority of Japanese Patent Application No. JP 2018-179465 filed on Sep. 25, 2018, the contents of which are incorporated herein.

TECHNICAL FIELD

The present disclosure relates to a relay device system.

BACKGROUND

ECUs (Electronic Control Units) for controlling on-board devices, such as powertrain-related ECUs for engine control and the like and body-related ECUs for air conditioner control and the like, are installed in vehicles. Furthermore, if a vehicle has a self-driving function, ECUs that control on-board devices for performing self-driving are installed in the vehicle. These ECUs are connected with an in-vehicle network provided by CAN (Controller Area Network) or Ethernet (registered trademark), and are connected to communication devices located outside the vehicle (external devices) via an external network by a wireless relay device (external communicator) that has wireless functionality (e.g., see JP 2018-93370A).

The wireless relay device of JP 2018-93370A is connected to a wired relay device (gateway) by an in-vehicle network that uses Ethernet (registered trademark). ECUs (Electronic Control Units) are connected to a wired relay device with an in-vehicle network that uses CAN (Controller Area Network) or the like. The ECUs are able to communicate with communication devices located outside the vehicle via the wired relay device and the wireless relay device.

In the on-board electronic control system disclosed in JP 2018-93370A, the wireless relay device and the wired relay device are connected to each other by a single path, and ECUs installed in the vehicle are connected only by the wired relay device. Therefore, there is a concern that, if a self-driving function is implemented in the vehicle, for example, it may be difficult to handle the increase in the number of ECUs installed. Also, it is conceivable to provide a plurality of wired relay devices to handle the increase in the number of ECUs installed, but the arrangement of the plurality of wired relay devices in the vehicle is not considered in the on-board electronic control system disclosed in JP 2018-93370A.

The present disclosure has been made in view of such circumstances, and an object thereof is to provide a relay device system capable of efficient routing regarding a plurality of wired relay devices when providing the plurality of wired relay device in a vehicle in correspondence with ECUs that are installed.

Advantageous Effects of Disclosure

According to one aspect of the present disclosure, it is possible to provide a relay device system capable of efficient routing regarding a plurality of wired relay devices when providing the plurality of wired relay device in the vehicle in correspondence with ECUs that are installed.

SUMMARY

A relay device system according to one aspect of this disclosure is a relay device system to be installed in a vehicle, the relay device system including a wireless relay device configured to wirelessly communicate with a communication device provided outside the vehicle, and a plurality of wired relay devices that are communicably connected to the wireless relay device, in which the plurality of wired relay devices each include a communication unit configured to communicably connect to an ECU for controlling an on-board device installed in the vehicle, the ECUs include an HMI-related ECU, a travel control-related ECU, and a self-driving-related ECU, the wired relay device that is connected to the HMI-related ECU and the wired relay device that is connected to the travel control-related ECU are arranged in a front portion of the vehicle, and the wired relay device that is connected to the self-driving-related ECU is arranged in a rear portion of the vehicle.

First, embodiments of the present disclosure will be listed and described. Also, at least parts of the embodiments described below can be freely combined.

A relay device system according to one aspect of this disclosure is a relay device system to be installed in a vehicle, the relay device system including a wireless relay device configured to wirelessly communicate with a communication device provided outside the vehicle, and a plurality of wired relay devices that are communicably connected to the wireless relay device, in which the plurality of wired relay devices each include a communication unit configured to communicably connect to an ECU for controlling an on-board device is installed in the vehicle, the ECUs include an HMI-related ECU, a travel control-related ECU, and a self-driving-related ECU, the wired relay device that is connected to the HMI-related ECU and the wired relay device that is connected to the travel control-related ECU are arranged in a front portion of the vehicle, and the wired relay device that is connected to the self-driving-related ECU is arranged in a rear portion of the vehicle.

In this aspect, because the wireless relay device is arranged on the roof of the vehicle, even if another vehicle collides with the vehicle from the side of the vehicle, for example, it is possible to reduce the influence of the collision on the wireless relay device arranged on the roof. Also, the wired relay device that is connected to the HMI-related ECU and the wired relay device that is connected to the travel control-related ECU are arranged in the front portion of the vehicle, and the wired relay device that is connected to the self-driving-related ECU is arranged in the rear portion of the vehicle, and thus, it is possible to efficiently route the relay devices as close as possible to the ECUs that are connected to these wired relay devices.

In the relay device system according to one aspect of this disclosure, the plurality of wired relay devices are arranged toward the driver's seat side in a left-right direction of the vehicle.

In this aspect, because the plurality of wired relay devices are arranged toward the driver's seat side in the left-right direction of the vehicle, if another vehicle collides with the vehicle from the opposite side to the driver's seat side, it is possible to reduce the influence of the collision on the wired relay devices, and to continue self-driving or handle driving operations performed by the driver.

In the relay device system according to one aspect of this disclosure, the plurality of wired relay devices are arranged toward an opposite side to the driver's seat side in the left-right direction of the vehicle.

In this aspect, because the plurality of wired relay devices are arranged toward the driver's seat side in the left-right direction of the vehicle, if another vehicle collides with the vehicle from the driver's seat side, it is possible to reduce the influence of the collision on the wired relay devices. Therefore, it is possible to continue self-driving without requiring driving operations performed by the driver.

In the relay device system according to one aspect of this disclosure, the wired relay device that is connected to the HMI-related ECU and the wired relay device that is connected to the travel control-related ECU are arranged to be divided between left and right sides of the front portion of the vehicle.

In this aspect, because the wired relay device that is connected to the HMI-related ECU and the wired relay device that is connected to the travel control-related ECU are arranged to be divided between the left and right sides of the front portion of the vehicle, if another vehicle collides with the vehicle from one side, it is possible to reduce the influence of the collision on the wired relay device arranged on the other side of the vehicle.

In the relay device system according to one aspect of this disclosure, the wireless relay device includes two communication ports for connecting to the wired relay devices, and the wired relay device that is connected to the self-driving-related ECU and the wired relay device that is connected to the HMI-related ECU are directly connected to the wireless relay device respectively via the two communication ports of the wireless relay device.

In this aspect, the wired relay device that is connected to the self-driving-related ECU and the wired relay device that is connected to the HMI-related ECU are directly connected to the wireless relay device. The wired relay device that is connected to the self-driving-related ECU and the wireless relay device are directly connected to each other, and the communication quality of information regarding self-driving is secured by reducing the number of hops (the number of relays) in communication between the self-driving-related ECU and a communication device provided outside the vehicle, and thereby safety regarding self-driving can be improved. Also, by directly connecting the wired relay device that is connected to the HMI-related ECU and the wireless relay device to each other, other wired relay devices need not relay large volume data such as moving image data or streaming data that is communicated between the HMI-related ECU and a communication device provided outside the vehicle.

The relay device system according to one aspect of this disclosure includes an in-vehicle network formed in a ring by a communication line connecting the wireless relay device and the plurality of wired relay devices, and the wireless relay device and the plurality of wired relay devices are configured to communicate with each other through the in-vehicle network, using two clockwise and counterclockwise paths.

In this aspect, the wireless relay device and the plurality of wired relay devices communicate with each other through an in-vehicle network formed in a ring, using two clockwise and counterclockwise paths. Therefore, even if one of the paths is interrupted due to disconnection, the wireless relay device and the plurality of wired relay devices can communicate with each other using the other path.

In the relay device system according to one aspect of this disclosure, the wireless relay device is provided on a roof of the vehicle, a portion of the communication line that is directly connected to the wireless relay device is routed inside a front pillar or a rear pillar of the vehicle, and the in-vehicle network is formed in a three-dimensional ring.

In this aspect, efficient routing is possible by routing a portion of the communication line that is directly connected to the wireless relay device inside the front pillar or the rear pillar of the vehicle to form the in-vehicle network in a three-dimensional ring.

DETAILED DESCRIPTION OF PREFERRED EMBODIMENTS

The following specifically describes the present disclosure based on the drawings illustrating embodiments thereof. A relay device system S according to embodiments of the present disclosure will be described below with reference to the drawings. Note that the present disclosure is not limited to these examples, but is indicated by the scope of the claims, and all changes that come within the meaning and range of equivalency of the claims are intended to be embraced therein.

Embodiment 1

Figure 1:
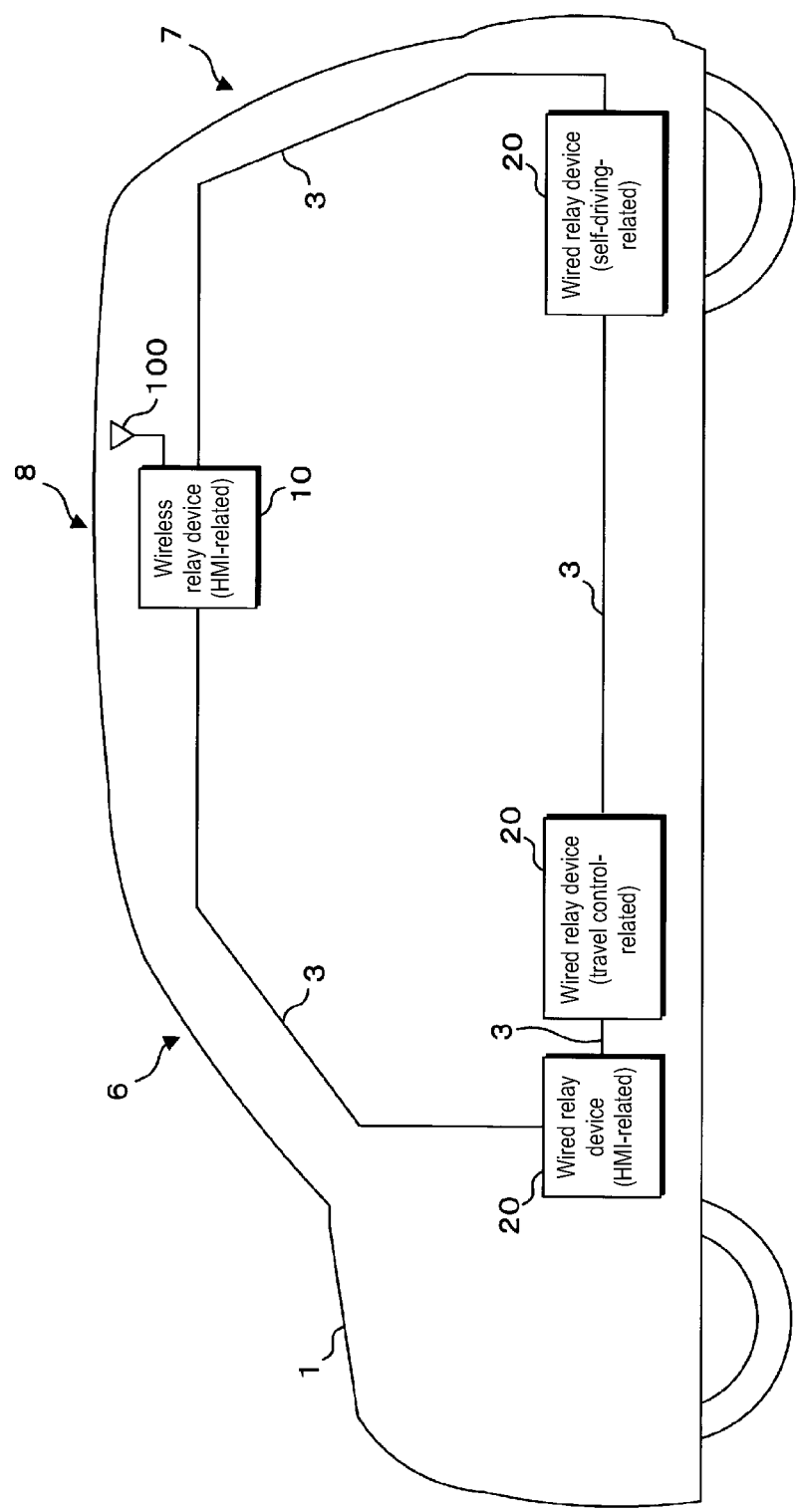
FIG. 1 is a schematic side view showing a configuration of a relay device system according to Embodiment 1.
Figure 2:
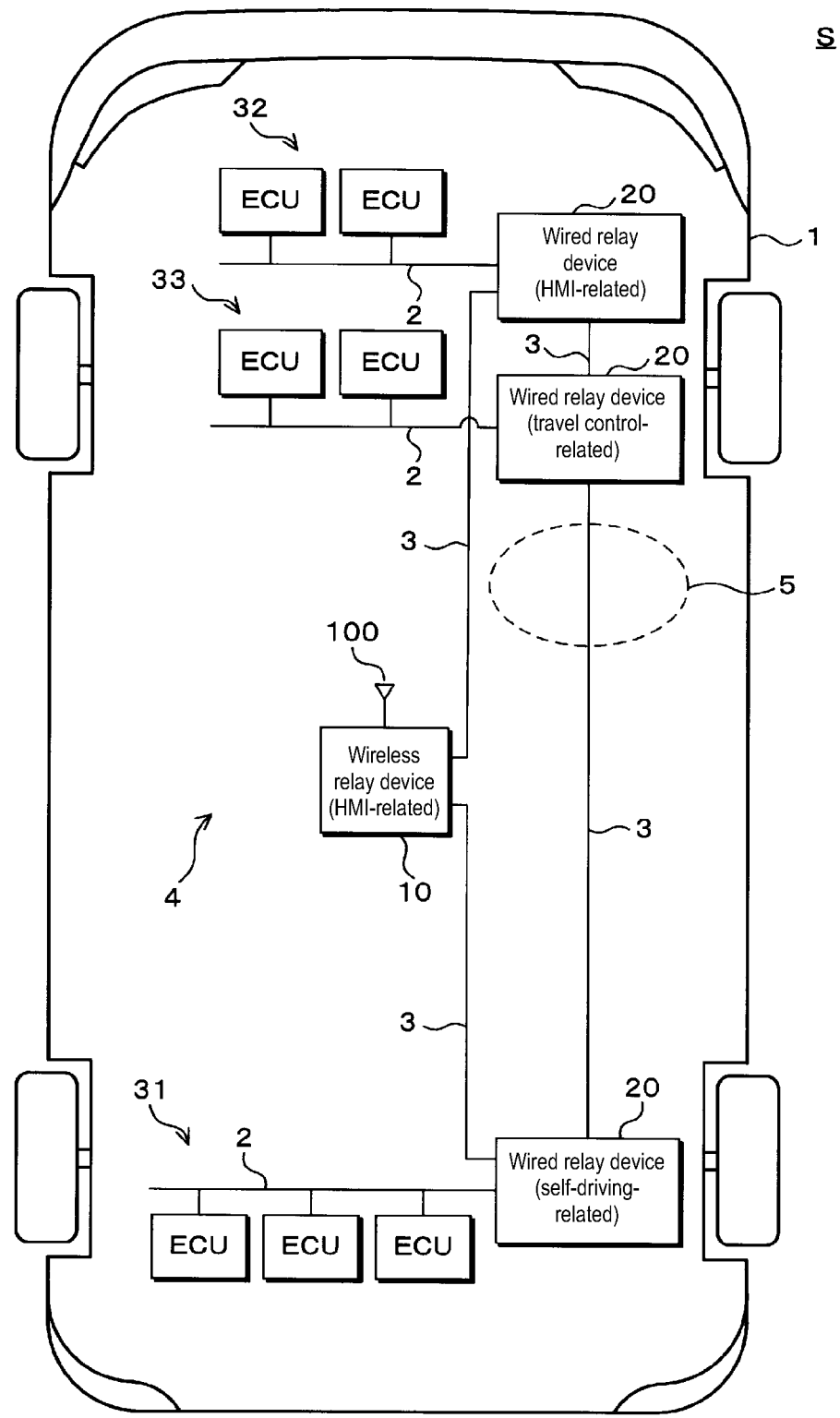
FIG. 2 is a schematic plan view showing a configuration of the relay device system according to Embodiment 1 (driver's seat side/ring).

FIG. 1 is a schematic side view showing a configuration of a relay device system according to Embodiment 1. FIG. 2 is a schematic plan view showing a configuration of the relay device system according to Embodiment 1 (the driver's seat side/ring). The relay device system S is installed in a vehicle 1, and includes a wireless relay device 10 and three wired relay devices 20.

Each of the wireless relay device 10 and the three wired relay devices 20 is communicably connected to another relay device (the wireless relay device 10 or a wired relay device 20) located on both the clockwise side and the counterclockwise side thereof, via a communication line 3 such as an Ethernet (registered trademark) cable or the like, for example. That is, a ring-like in-vehicle network 4 (ring network topology) is formed due to the wireless relay device 10 and the three wired relay devices 20 being connected to each other via the communication lines 3. Note that the number of wired relay devices 20 is three, but is not limited thereto. The number of wired relay devices 20 need only be two or more, as long as the number of relay devices including the wired relay devices 20 and the wireless relay device 10 is three or more, and the ring-like in-vehicle network 4 can be formed by these relay devices (the wired relay devices 20 and the wireless relay device 10).

As shown in FIG. 1, the wireless relay device 10 is provided on a roof 8, which serves as an upper portion of the vehicle 1, and three wired relay devices 20 are provided in a lower portion of the vehicle 1. A portion of a communication line 3 connecting the wireless relay device 10 and an HMI-related wired relay device 20 provided in a lower front portion of the vehicle 1 is routed inside a front pillar of the vehicle 1. A portion of a communication line 3 connecting the wireless relay device 10 and a self-driving-related wired relay device 20 provided in a lower rear portion of the vehicle 1 is routed inside a rear pillar 7 of the vehicle 1. In this manner, by routing the communication lines 3 connecting the wireless relay device 10 provided on the roof 8 and the wired relay devices 20 that are provided in the lower portion of the vehicle 1 and are directly connected to the wireless relay device 10 through the inside of the front pillar 6 and the rear pillar 7, a three-dimensional ring-like in-vehicle network 4 is formed. Note that details of the wired relay devices 20, including the HMI-related wired relay device 20 and the self-driving-related wired relay device 20, will be described later.

The wireless relay device 10 is connected to an external antenna 100 for wirelessly communicating with communication devices (not shown) outside the vehicle. The wireless relay device 10 wirelessly communicates with communication devices outside the vehicle, and transmits (relays) various types of data received through this wireless communication to the wired relay devices 20. The wireless relay device 10 relays communication between communication devices outside the vehicle and later-described ECUs (Electronic Control Units) installed in the vehicle. Also, the wireless relay device 10 relays communication between the two wired relay devices 20 that are directly connected thereto.

The plurality of wired relay devices 20 are communicably connected to ECUs (self-driving-related ECUs 31, HMI-related ECUs 32, and travel control-related ECUs 33) that control on-board devices via ECU wiring 2 such as a CAN (Controller Area Network/registered trademark) cable or an Ethernet cable. Note that the ECUs that are respectively connected to the plurality of wired relay devices 20 are not limited to the self-driving-related ECUs 31, the HMI-related ECUs 32, or the travel control-related ECUs 33, and may be body-related ECUs for controlling the driving of a door mirror or a seat, for example, and various ECUs installed in the vehicle 1 are connected to these multiple wired relay devices 20.

The HMI-related ECUs 32 are connected to the wired relay device 20 that is directly connected on the clockwise side of the wireless relay device 10. The self-driving-related ECUs 31 are connected to the wired relay device 20 that is directly connected on the counterclockwise side of the wireless relay device 10. The travel control-related ECUs 33 are connected to the wired relay device 20 connected between the wired relay device 20 for the HMI-related ECUs 32 and the wired relay device 20 for the self-driving-related ECUs 31.

Each wired relay device 20 relays communication between the wireless relay device 10 or the other wired relay devices 20 directly connected on the clockwise side and the counterclockwise side thereof. Also, each wired relay device 20 relays information transmitted from the wireless relay device 10 or another wired relay device 20, and transmits the information to the ECUs that are directly connected thereto. Each wired relay device 20 relays information transmitted from the ECUs that are directly connected thereto, and transmits the information to the wireless relay device 10 or another wired relay device 20.

The wireless relay device 10 is located in a central portion of the vehicle 1, and is provided on the roof 8 of the vehicle 1, and accordingly, the external antenna 100 connected to the wireless relay device 10 can favorably receive radio waves.

The wired relay device 20 that is connected to the self-driving-related ECUs 31 is provided on the driver's seat 5 side (right side in FIG. 2) in the left-right direction of the vehicle 1, in a rear portion (rearward on the driver's seat 5 side) of the vehicle 1 in the front-back direction.

The wired relay device 20 that is connected to the HMI-related ECUs 32 is provided in a front portion (frontward on the driver's seat 5 side) of the vehicle 1 on the driver's seat 5 side, such as inside an instrument panel (dashboard), for example.

The wired relay device 20 that is connected to the travel control-related ECUs 33 is provided in the front portion (frontward on the driver-'s seat 5 side) of the vehicle 1 on the driver's seat 5 side, such as inside the instrument panel (dashboard), for example.

The self-driving-related ECUs 31 are arranged in the rear portion of the vehicle, and the HMI-related ECUs 32 and the travel control-related ECUs 33 are arranged in the front portion of the vehicle. Therefore, by arranging each wired relay device 20 as close as possible to the ECUs that are connected thereto in this manner, it is possible to simplify routing, such as by shortening the wiring length of the ECU wiring 2 connecting the wired relay device 20 and the ECUs.

The plurality of wired relay devices 20 that are constituted by the wired relay device 20 that is connected to the self-driving-related ECUs 31, the wired relay device 20 that is connected to the HMI-related ECUs 32, and the wired relay device 20 that is connected to the travel control-related ECUs 33 are arranged toward the driver's seat 5 side. Therefore, if another vehicle collides with the vehicle from the opposite side to the driver's seat 5 (side collision), it is possible to reduce the influence of the collision on the plurality of wired relay devices 20, and to continue self-driving or handle driving operations performed by the driver.

Although the wired relay device 20 that is connected to the HMI-related ECUs 32 and the wired relay device 20 that is connected to the travel control-related ECUs 33 are provided inside the instrument panel, there is no limitation thereto. The wired relay device 20 that is connected to the HMI-related ECUs 32 and the wired relay device 20 that is connected to the travel control-related ECUs 33 may be provided inside the floor of the vehicle 1, such as below the driver's seat.

Figure 3:
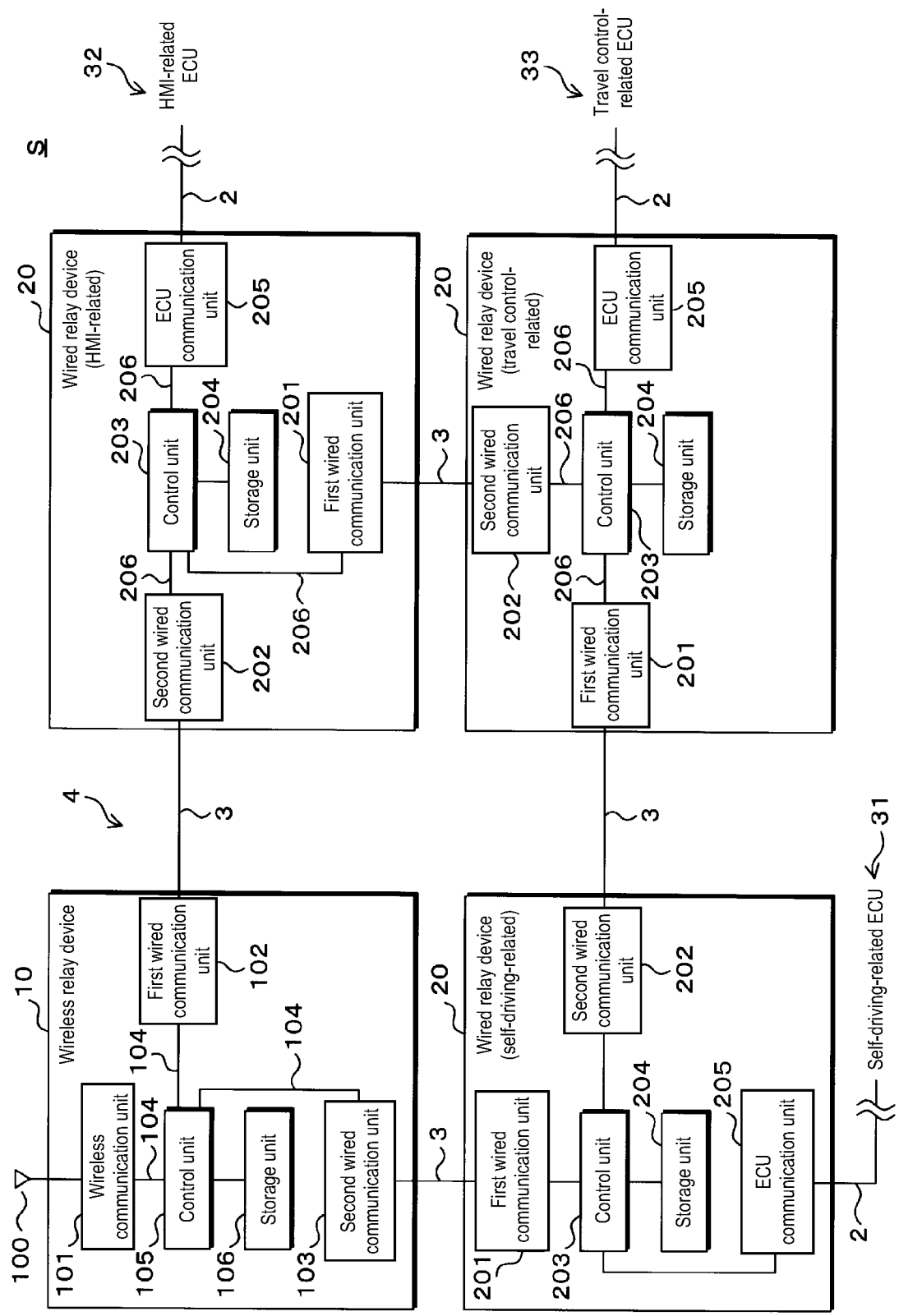
FIG. 3 is a block diagram showing configurations of a wireless relay device and wired relay devices.

FIG. 3 is a block diagram showing configurations of the wireless relay device 10 and the wired relay devices 20. The wireless relay device 10 includes a wireless communication unit 101, a control unit 105, a storage unit 106, a first wired communication unit 102, and a second wired communication unit 103, and is connected to the external antenna 100. Note that the wireless relay device 10 may include this external antenna 100.

The wireless communication unit 101 is connected via a harness or the like to the external antenna 100 for wirelessly communicating with communication devices outside the vehicle. The wireless communication unit 101 uses a predetermined wide-area communication standard such as 5G, 4G, LTE, or the like, to wirelessly communicate with communication devices outside the vehicle, and is a communication device known as a TCU (Telematics Communication Unit), for example.

The control unit 105 may be constituted by a CPU (Central Processing Unit), an MPU (Micro Processing Unit), or the like, and performs various types of control processing and arithmetic processing by reading out and executing control programs and data previously stored on the storage unit 106. The control unit 105 is communicably connected via an internal bus 104 to the wireless communication unit 101, the first wired communication unit 102, and the second wired communication unit 103. The control unit 105 performs control to relay data to be communicated to the wireless communication unit 101, the first wired communication unit 102, and the second wired communication unit 103 by executing the control programs.

The control programs include security programs for ensuring the security of the wireless relay device 10. The control unit 105 executes the security programs to exhibit security functions to handle unauthorized communication (attacks) from outside of the vehicle by way of, for example, DoS attacks or data containing viruses, worms, or the like, and thus ensure the security (secure a secure communication state) of the wireless relay device 10.

The storage unit 106 is constituted by a volatile memory element such as RAM (Random Access Memory), or a non-volatile memory element such ROM (Read Only Memory), EEPROM (Electrically Erasable Programmable ROM), or flash memory, and pre-stores control programs and data that is referenced when processing is performed. The control programs stored on the storage unit 106 may also be control programs that are read out from a recording medium (not shown) readable by the wireless relay device 10 and stored on the storage unit 106. The control programs may also be downloaded from an external computer (not shown) that is connected to a communication network (not shown) and stored on the storage unit 106.

Path information for communicating with the plurality of wired relay devices 20 or the ECUs connected to the plurality of wired relay devices 20 is stored on the storage unit 106 in table form, for example. The path information includes addresses of the plurality of wired relay devices 20 and ECUs. Furthermore, the path information includes, as paths for transmitting (relaying) information to the plurality of wired relay devices 20 and the ECUs, a correspondence relationship as to which of the first wired communication unit 102 or the second wired communication unit 103 is to be used to transmit the information to the addresses of the plurality of wired relay devices 20 and the ECUs. Accordingly, by referencing the path information stored on the storage unit 106, the control unit 105 can relay communication between the ECUs and communication devices outside the vehicle, or communication between the ECUs.

The first wired communication unit 102 and the second wired communication unit 103 are input-output I/Fs such as Ethernet communication ports, and the protocols of the physical layers thereof may be of IEEE standards such as 100BASE-T1 or 1000BASE-T1, for example. If the first wired communication unit 102 and the second wired communication unit 103 are Ethernet communication ports, for example, port numbers of communication ports are set (provided) to the first wired communication unit 102 and the second wired communication unit 103. The port number of the first wired communication unit 102 is one, and the port number of the second wired communication unit 103 is two, for example. In the above-described path information stored on the storage unit 106, the port number (1) of the first wired communication unit 102 or the port number (2) of the second wired communication unit 103 is set in correspondence with the addresses of the plurality of wired relay devices 20 and the ECUs (the port numbers are set in association with the addresses). Note that a port number for loopback (e.g., zero) may be set for the address of this wireless relay device 10.

The wired relay devices 20 each include a first wired communication unit 201, a second wired communication unit 202, a control unit 203, a storage unit 204, and an ECU communication unit 205. The control unit 203 of the wired relay device 20 has a configuration that is similar to that of the control unit 105 of the wireless relay device 10 described above. The control unit 203 of the wired relay device 20 is communicably connected to the first wired communication unit 201, the second wired communication unit 202, and the ECU communication unit 205 via an internal bus 206. The control unit 203 performs control to relay data to be communicated to the first wired communication unit 201, the second wired communication unit 202, and the ECU communication unit 205 by reading out and executing control programs and data stored on the storage unit 204.

The control programs of the wired relay device 20 may also include security programs for ensuring the security of the wired relay device 20, similarly to the control programs of the wireless relay device 10. The control unit 203 of the wired relay device 20 exhibits security functions to handle unauthorized communication (attacks) such as data containing viruses and thus ensure the security of the wired relay device 20.

The storage unit 204 of the wired relay device 20 has a configuration that is similar to that of the storage unit 106 of the wireless relay device 10 described above. Path information for communicating with the wireless relay device 10, the other wired relay devices 20, or the ECUs is stored on the storage unit 204 of the wired relay device 20 in table form, for example, similarly to the storage unit 106 of the wireless relay device 10. The path information includes the addresses of the wireless relay device 10, the plurality of wired relay devices 20, and the ECUs. Furthermore, the path information includes a correspondence relationship as to which of the first wired communication unit 201 and the second wired communication unit 202 is to be used to transmit (relay) the information to the addresses of the wireless relay device 10, the plurality of wired relay devices 20, and ECUs, as paths for transmitting (relaying) information to the wireless relay device 10, the plurality of wired relay devices 20, and the ECUs.

The plurality of wired relay devices 20 and the wireless relay device 10 function as a layer 2 switch or a layer 3 switch, for example. If the plurality of wired relay devices 20 and the wireless relay device 10 function as a layer 2 switch, the MAC addresses of the plurality of wired relay devices 20, the wireless relay device 10, and the ECUs are stored on the storage unit 204 as path information. If the plurality of wired relay devices 20 and the wireless relay device 10 function as a layer 3 switch, the IP addresses of the plurality of wired relay devices 20, the wireless relay device 10, and the ECUs are stored on the storage unit 204 as path information. Accordingly, by referencing the path information stored on the storage unit 204, the control unit 203 of the wired relay device 20 can relay communication between the ECUs connected to this wired relay device 20 and communication devices outside the vehicle, or communication between the ECUs connected to this wired relay device 20 and the ECUs connected to other wired relay devices 20.

The first wired communication unit 201 and the second wired communication unit 202 of the wired communication unit 20 are input-output I/Fs such as Ethernet communication ports that conform to standards similar to those of the first wired communication unit 102 and the second wired communication unit 103 of the wireless relay device 10, and the protocols of physical layers may be 100BASE-T1 or 1000BASE-T1, for example.

The first wired communication unit 201 of the wired relay device 20 that is directly connected on the counterclockwise side of the wireless relay device 10 and the second wired communication unit 103 of the wireless relay device 10 are connected by the communication line 3 via an Ethernet cable such as that of 100BASE-T1 or 1000BASE-T1, for example. The second wired communication unit 202 of the wired relay device 20 that is directly connected on the clockwise side of the wireless relay device 10 and the first wired communication unit 102 of the wireless relay device 10 are connected by the communication line 3 in a similar manner. The wired relay device 20 that is not directly connected to the wireless relay device 10 is connected to the other wired relay devices 20 that are directly connected on the clockwise side and the counterclockwise side via the first wired communication unit 201 (on the clockwise side) and the second wired communication unit 202 (on the counterclockwise side). That is, the first wired communication unit 201 (on the clockwise side) of the wired relay device 20 that is not directly connected to the wireless relay device 10 and the second wired communication unit 202 (on the counterclockwise side) of the other wired relay device 20 that is directly connected on the clockwise side of this wired relay device 20 are connected to each other via the communication line 3. The second wired communication unit 202 (on the counterclockwise side) of the wired relay device 20 that is not directly connected to the wireless relay device 10 and the first wired communication unit 201 (on the clockwise side) of the other wired relay device 20 that is directly connected on the clockwise side of this wired relay device 20 are connected to each other via the communication line 3.

The ECUs are connected to a corresponding one of the plurality of wired relay devices 20 via the respective ECU communication units 205. The ECUs are constituted by programs for controlling the corresponding on-board devices and microcomputers and the like for executing the programs. As shown in FIG. 2, each of the ECUs (the self-driving-related ECUs 31, the HMI-related ECUs 32, and the travel control-related ECUs 33) is connected to one of the wired relay devices 20 according to the priority level of that ECU regarding traveling safety.

Figures 4, 5:
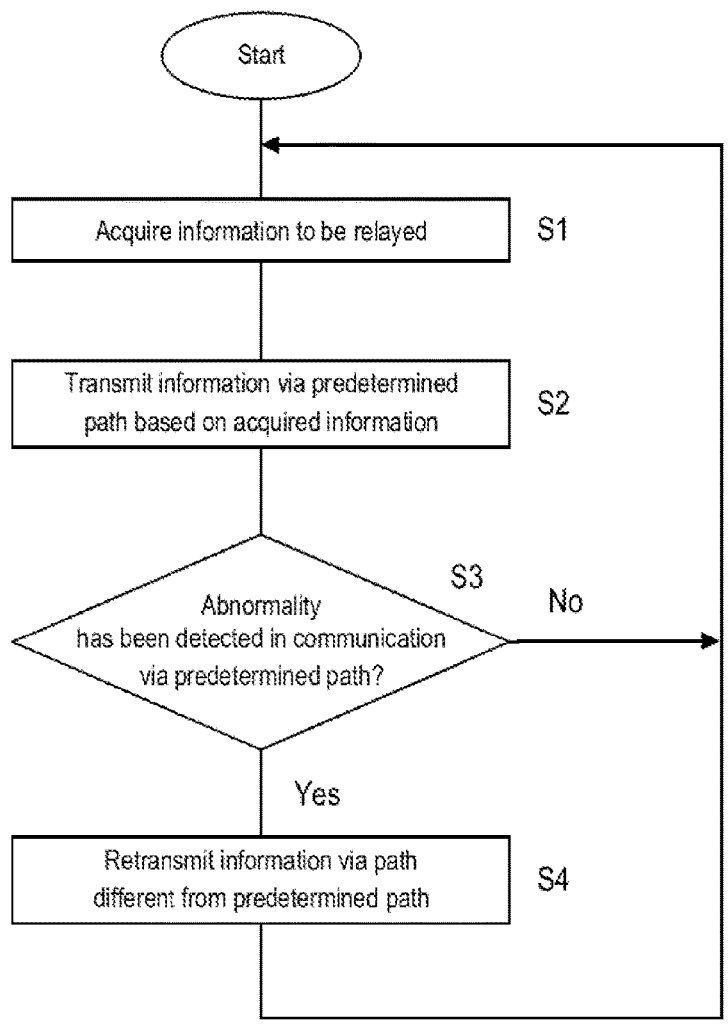
FIG. 4 is an illustrative diagram regarding priority levels of the traveling safety of ECUs.
FIG. 5 is a flowchart showing processing performed by a control unit according to Embodiment 1.

FIG. 4 is an illustrative diagram regarding priority levels of the ECUs regarding traveling safety. The priority levels of the ECUs (the self-driving-related ECUs 31, the HMI-related ECUs 32, and the travel control-related ECUs 33) regarding the traveling safety of the vehicle 1 are determined based on the corresponding on-board devices and the functions of the programs to be executed, and may be determined based on, for example, ASIL (Automotive Safety Integrity Level) in ISO 26262. As shown in FIG. 4, the ASIL levels are classified into levels QM, ASIL-A, ASIL-B, ASIL-C, and ASIL-D. The QM level is normal quality management in which it is not necessary to apply functional safety according to ISO 26262. The ASIL-A to ASIL-D levels are levels at which functional safety needs to be applied in accordance ISO 26262, and the functional safety requirements become stricter from ASIL-A to ASIL-D. That is, the QM level can be regarded as the lowest priority level, and the ASIL-D level can be regarded as the highest priority level.

As the ECUs corresponding to the ASIL levels, for example, ECUs that correspond to the QM level may be HMI (Human Machine Interface)-related ECUs 32 that control or process entertainment-related data such as moving image data or streaming data handled by an HMI device such as car navigation and TV. ECUs that correspond to the ASIL-A level are body-related ECUs that control the positions of the seats, control the door mirrors, or the like. The ECUs that correspond to the ASIL-B level are travel control-related ECUs 33 related to control such as driving control of engines, motors, or the like. The ECUs corresponding to the ASIL-C level are travel control-related ECUs 33 related to control such as steering control or brake control. The ECUs corresponding to the ASIL-D level are self-driving-related ECUs 31 related to self-driving control.

Alternatively, the priority levels of the ECUs regarding the traveling safety of the vehicle 1 are set such that the priority level of the self-driving-related ECUs 31 is the highest, the priority level of the ECUs that perform control related to the turning or stopping of the vehicle 1 is the next highest, and the priority level of the ECUs that perform control related to the traveling (running) of the vehicle 1 is the next highest. Configurations are also possible in which the priority level of ECUs that perform control other than the forms of control mentioned above, such an HMI-related ECUs 32 that control HMI-related devices, is the lowest.

As described above, the ECUs (the self-driving-related ECUs 31, the HMI-related ECUs 32, and the travel control-related ECUs 33) are connected to a corresponding one of the plurality of wired relay devices 20. The self-driving-related ECUs 31 are connected to the wired relay device 20 that is directly connected on the counterclockwise side of the wireless relay device 10. The travel control-related ECUs 33 are connected to the wired relay device 20 that is not directly connected to the wireless relay device 10. That is, the wired relay device 20 that is connected to the self-driving-related ECUs 31 is a wired relay device having a higher priority level regarding the traveling safety of the vehicle 1 than that of the wired relay device 20 that is connected to the travel control-related ECUs 33. By directly connecting the wired relay device 20 having a higher priority level regarding the traveling safety of the vehicle 1 to the wireless relay device 10 in this manner, it is possible to reduce the number hops (the number of relays) in communication between communication devices outside the vehicle and the ECU having a higher priority level regarding the traveling safety of the vehicle 1, such as the self-driving-related ECUs 31, and, to secure communication quality.

The HMI-related ECUs 32 are connected to the wired relay device 20 that is directly connected on the clockwise side of the wireless relay device 10. Large volume data such as moving image data or streaming data is transmitted and received between a display device under the control of the HMI-related ECUs 32 and communication devices outside the vehicle, for example. By directly connecting the wired relay device 20 that is connected to the HMI-related ECUs 32 to the wireless relay device 10, it is possible to suppress the flow of large volume data to the other wired relay devices 20, and to eliminate processing in which the other wired relay devices 20 relay large volume data.

The respective control units 105 and 203 of the wireless relay device 10 and the plurality of wired relay devices 20 acquire information transmitted from communication devices outside the vehicle or the other relay devices (the wireless relay device 10 or the wired relay devices 20), and reference path information respectively stored on the storage units 106 and 204 based on the destination addresses included in the information. The control units 105 and 203 determine, based on the referenced path information, whether to use a clockwise (the first wired communication units 102 and 201) path or a counterclockwise (the second wired communication units 103 and 202) path in the in-vehicle network 4 forming a ring. Alternatively, the respective control units 105 and 203 of the wireless relay device 10 and the plurality of wired relay devices 20 may derive predetermined paths that have been decided in advance and are respectively stored on the storage units 106 and 204 based on the destination addresses included in this information. The respective control units 105 and 203 of the wireless relay device 10 and the plurality of wired relay devices 20 relay information by transmitting the acquired information via the determined or derived paths (clockwise or counter-clockwise).

If the respective control units 105 and 203 of the wireless relay device 10 and the plurality of wired relay devices 20 have detected an abnormality in communication with the other relay devices, such as failure of normal transmission of the information transmitted via the path, the control units 105 and 203 communicate with the other relay devices via a path that is different from the determined or derived path. That is, if the determined or derived path is clockwise, when the respective control units 105 and 203 of the wireless relay device 10 and the plurality of wired relay devices 20 have detected an abnormality in the clockwise path, the control units 105 and 203 communicate with the other relay devices via the counterclockwise path. If the determined or derived path is counterclockwise, when the respective control units 105 and 203 of the wireless relay device 10 and the plurality of wired relay devices 20 detect an abnormality in the counterclockwise path, the control units 105 and 203 communicate with the other relay devices via the clockwise path.

If the respective control units 105 and 203 of the wireless relay device 10 and the plurality of wired relay devices 20 have detected an abnormality in communication via the determined or derived path, the control units 105 and 203 may modify path information that is stored on the respective storage units 106 and 204. The path information is stored with the path corresponding to the destination address of the wired relay device 20 or the like serving as the destination as the first wired communication units 102 and 201, for example, and if an abnormality has been detected in communication with that wired relay device 20 via the first wired communication units 102 and 201, the respective control units 105 and 203 modify the paths corresponding to the addresses of these wired relay devices 20 to the second wired communication units 103 and 202. The path information that is stored on the respective storage units 106 and 204 is rewritten by modifying this path.

The respective control units 105 and 203 of the wireless relay device 10 and the plurality of wired relay devices 20 detect an abnormality in communication with other relay devices (the wireless relay device 10 or the wired relay devices 20) due to whether or not there is a reply to transmitted information, for example. The method for detecting an abnormality in communication is not limited thereto, and the respective control units 105 and 203 of the wireless relay device 10 and the plurality of wired relay devices 20 may periodically perform polling with the wireless relay device 10 or the wired relay devices 20 that is directly connected thereto, and detect an abnormality in communication based on the results of this polling, for example. Alternatively, the respective control units 105 and 203 of the wireless relay device 10 and the plurality of wired relay devices 20 may detect carrier sense in the first wired communication units 102 and 201 or the second wired communication units 103 and 202. Then, the control units 105 and 203 may detect disconnection of the communication line 3 connected to the first wired communication units 102 and 201 or the second wired communication units 103 and 202 based on whether or not the detected carrier sense has a predetermined voltage value, and thus detect an abnormality in communication. Furthermore, the respective control units 105 and 203 of the wireless relay device 10 and the plurality of wired relay devices 20 may store the location where this abnormality has occurred in the storage units 106 and 204 of these relay devices, based on the results of detection of abnormalities in communication. The location where the abnormality has occurred is specified as being between the relay device (the wireless relay device 10 or the wired relay devices 20) that detected the abnormality and the other relay device that is directly connected thereto. Alternatively, the location where the abnormality has occurred may be specified as being between relay devices (the wireless relay device 10 or the wired relay devices 20) that are specified by MAC addresses or IP addresses, for example. Also, the wireless relay device 10 may transmit information regarding the results of detection of abnormalities in communication, including information regarding the location where the abnormality has occurred in communication, to a communication device outside the vehicle via the wireless communication unit 101. As a result of storing, in the storage units 106 and 204, information regarding the results of detection of abnormalities in communication, including information regarding the location where abnormalities have occurred in communication, the respective control units 105 and 203 of the wireless relay device 10 and the plurality of wired relay devices 20 can efficiently perform control regarding communication paths based on the stored information.

The respective control units 105 and 203 of the wireless relay device 10 and the plurality of wired relay devices 20 detect an abnormality in communication with other relay devices (the wireless relay device 10 or the wired relay devices 20 in this manner. Furthermore, the control units 105 and 203 change the paths for communicating with the other relay devices (the wireless relay device 10 or the wired relay devices 20) or modify path information according to the results of detection, and thus it is possible to improve and secure the redundancy of communication between the wireless relay device 10 and the plurality of wired relay devices 20 connected to the in-vehicle network 4 formed in a ring. By securing the redundancy of communication between the wireless relay device 10 and the plurality of wired relay devices 20 connected to the in-vehicle network 4, it is possible to improve and secure the redundancy of communication with the ECUs that are respectively connected to the wired relay devices 20 and communication devices outside the vehicle.

The in-vehicle network 4 formed in a ring is three-dimensionally configured due to the communication lines 3 connecting the wireless relay device 10 provided on the roof 8, and the HMI-related wired relay device 20 and the self-driving-related wired relay device 20 that are provided in the lower portion of the vehicle 1 being routed inside the front pillar 6 and the rear pillar 7. Therefore, if another vehicle collides with the vehicle 1 from the side of the vehicle 1, it is possible to reduce the influence of the collision on the wireless relay device 10 provided on the roof 8, which serves as the upper portion of the vehicle 1. Furthermore, even if the communication line 3 connecting the wireless relay device 10 and one of the wired relay devices 20 is disconnected, it is possible to continue communication between the wired relay devices 20 and the wireless relay device 10, using a path (clockwise or counterclockwise) via the communication lines 3 that are not disconnected. Thus, it is possible to continue communication between the ECUs that are connected to the wired relay devices 20 and communication devices outside the vehicle via the wireless relay device 10.

FIG. 5 is a flowchart showing processing performed by the control unit 105 according to Embodiment 1. The control unit 105 of the wireless relay device 10 performs the following processing based on a predetermined input signal that is input regularly or in cases such as where the ignition switch (IG switch) is turned on.

The control unit 105 of the wireless relay device 10 acquires information that is relayed from a communication device outside the vehicle or a wired relay device 20, which is another relay device (step S01). The control unit 105 acquires information transmitted from a communication device outside the vehicle via the wireless communication unit 101. Alternatively, the control unit 105 acquires information transmitted from the wired relay device 20 that is directly connected on the clockwise side or the counterclockwise side of the wireless relay device 10 via the first wired communication unit 102 or the second wired communication unit 103. This information is information to be relayed to a wired relay device 20 or an ECU that is connected to a wired relay device 20.

The control unit 105 of the wireless relay device 10 transmits information via a predetermined path based on the acquired information (step S02). The control unit 105 references the destination address included in a header portion in the acquired information, for example, and derives a predetermined path. The control unit 105 references the path information stored on the storage unit, and derives the path corresponding to the destination address, that is, the path through which to communicate via the first wired communication unit 102 or the second wired communication unit 103. Alternatively, the control unit 105 may derive a predetermined path without referencing the path information, by using a default setting according to all acquired information is to be transmitted on a path via either the first wired communication unit 102 or the second wired communication unit 103.

The control unit 105 of the wireless relay device 10 detects whether or not an abnormality has occurred in communication via the predetermined path (step S03). The control unit 105 detects whether or not an abnormality has occurred in communication via the derived predetermined path, and determines whether or not an abnormality has occurred, based on the results of detection. If the control unit 105 of the wireless relay device 10 has transmitted information via the predetermined path and then has not received a reply to this transmission in a predetermined period of time, for example, the control unit 105 detects an abnormality in communication via the predetermined path.

If an abnormality has been detected (YES in step S03), the control unit 105 of the wireless relay device 10 retransmits the information via a path that is different from the predetermined path derived in step S02 (step S04). That is, if the predetermined path derived in step S02 is a clockwise path (the first wired communication unit 102), the control unit 105 performs communication via a counterclockwise path (the second wired communication unit 103), and retransmits the information that failed to transmit in step S02. The control unit 105 performs loop processing in order to perform the processing of step S01 again after performing the processing of step S04, and continues the processing for relaying the acquired information.

If no abnormality has been detected (NO in step S03), that is, if communication is normally performed via the predetermined path, the control unit 105 of the wireless relay device 10 performs loop processing in order to perform processing of step S01 again. If communication is normally performed via the predetermined path, the control unit 105 can continue processing for relaying the information by successively acquiring information to be relayed, and transmitting the information via the predetermined path.

Every time the control unit 105 of the wireless relay device 10 communicates with a wired relay device 20, which is another relay device, the control unit 105 detects whether or not an abnormality occurs in communication, and if the control unit 105 has detected an abnormality, the control unit 105 resumes communication via a path that is different from the predetermined path decided in advance, and thereby, the redundancy of communication in the in-vehicle network 4 can be achieved. Also, this abnormality temporarily occurs and after being resolved, it is possible to perform communication between the wireless relay device 10 and the wired relay devices 20 in the in-vehicle network 4 via the predetermined path decided in advance.

Although the flow of the processing performed by the control unit 105 of the wireless relay device 10 has been described in this embodiment, there is no limitation thereto. The respective control units 203 of the plurality of wired relay devices 20 can also achieve the redundancy of communication in the in-vehicle network 4 by performing processing similar to that of the control unit 105 of the wireless relay device 10.

Although, in this embodiment, the control unit 105 of the wireless relay device 10 is configured such that, if an abnormality has been detected, the control unit 105 retransmits information via a path that is different from the derived predetermined path, there is no limitation thereto. A configuration may be adopted in which, if an abnormality has been detected, the control unit 105 of the wireless relay device 10 modifies the path information and retransmits the information. If the control unit 105 has detected an abnormality in communication with a wired relay device 20, which is another relay device, the control unit 105 modifies the path information so as to use a different path from the path set in the path information stored on the storage unit 106. Therefore, after the control unit 105 has detected an abnormality, the control unit 105 can resume communication with the wired relay device 20 by referencing the modified path information.

Embodiment 2

Figure 6:
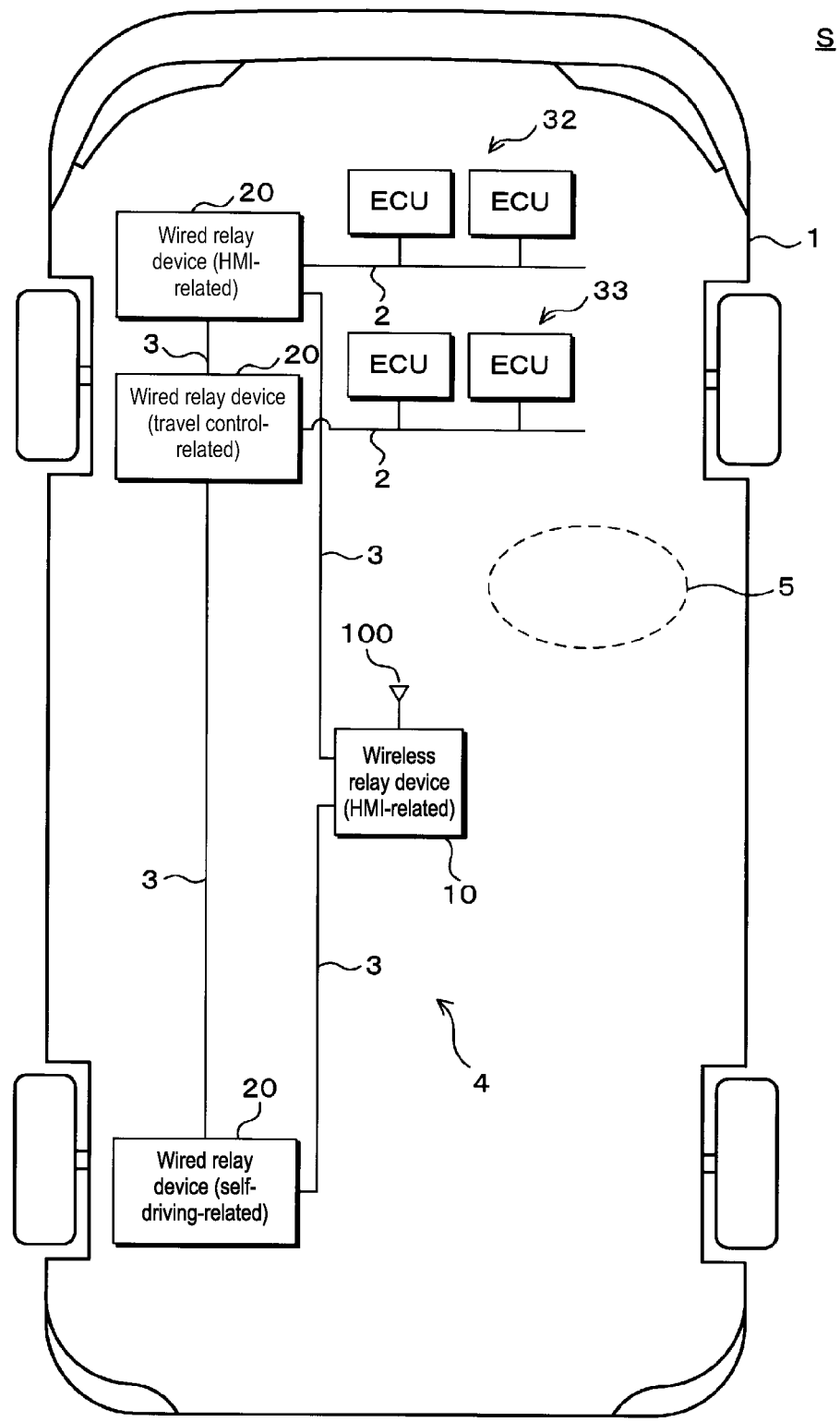
FIG. 6 is a schematic diagram showing a configuration of a relay device system according to Embodiment 2 (opposite side to the driver's seat).

FIG. 6 is a schematic diagram showing a configuration of a relay device system according to Embodiment 2 (opposite side to the driver's seat). Embodiment 2 differs from Embodiment 1 in that a plurality of wired relay devices 20 are arranged toward the opposite side to the driver's seat 5 side in the relay device system of Embodiment 2.

The wired relay device 20 that is connected to the self-driving-related ECUs 31 is provided on the opposite side to the driver's seat 5 (left side in FIG. 6) in the left-right direction of the vehicle 1, in a rear portion (rearward on the opposite side to the driver's seat 5) in the front-back direction.

The wired relay device 20 that is connected to the HMI-related ECUs 32 is provided in the front portion (frontward on the opposite side to the driver's seat 5) of the vehicle 1 on the opposite side to the driver's seat 5, such as inside the instrument panel, for example.

The wired relay device 20 that is connected to the travel control-related-related ECUs 33 is provided in the front portion (frontward on the opposite side to the driver's seat 5) of the vehicle 1 on the opposite side to the driver's seat 5, such as inside the instrument panel, for example.

By arranging each wired relay device 20 as close as possible to the ECUs that are connected thereto in this manner, it is possible to simplify routing, such as by shortening the wiring length of the ECU wiring 2 connecting the wired relay device 20 and the ECUs.

The plurality of wired relay devices 20 that are constituted by the wired relay device 20 that is connected to the self-driving-related ECUs 31, the wired relay device 20 that is connected to the HMI-related ECUs 32, and the wired relay device 20 that is connected to the travel control-related ECUs 33 are arranged toward the opposite side to the driver's seat 5 side. Therefore, if another vehicle collides with the vehicle from the driver's seat 5 side (side collision), it is possible to reduce the influence of the collision on the plurality of wired relay devices 20, and to continue self-driving, without requiring driving operations performed by the driver. In particular, if the driver is injured in a collision with the other vehicle from the driver's seat 5 side, it is possible to contribute to rescue efforts such as by transporting the driver to an appropriate place while reducing the burden on the driver by continuing self-driving in this manner.

Embodiment 3

Figure 7:
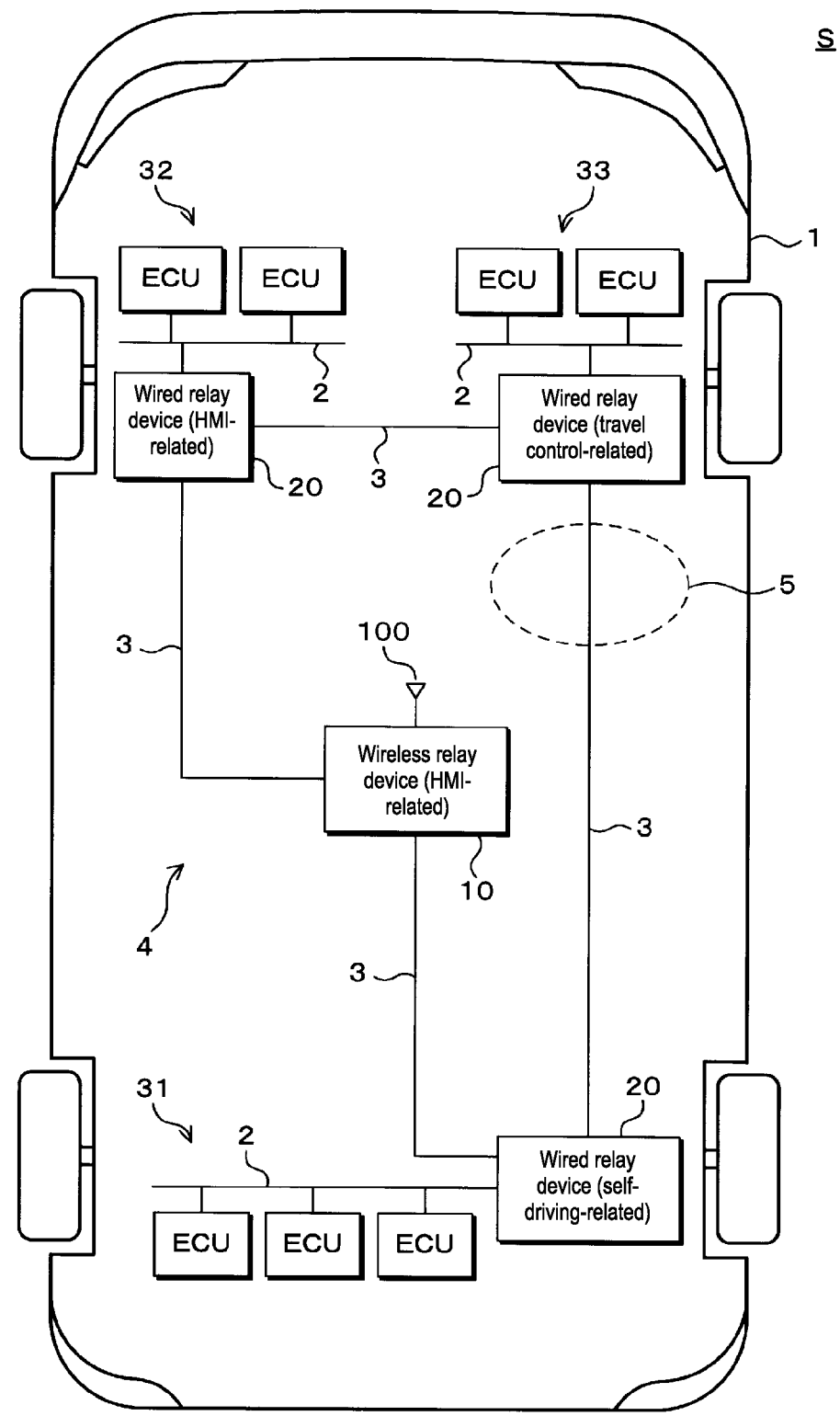
FIG. 7 is a schematic diagram showing a configuration of a relay device system according to Embodiment 3 (left/right arrangement).

FIG. 7 is a schematic diagram showing a configuration of a relay device system according to Embodiment 3 (left/right arrangement). Embodiment 3 differs from Embodiment 1 in that, in the relay device system of Embodiment 3, the wired relay device 20 that is connected to HMI-related ECUs 32, and the wired relay device 20 that is connected to travel control-related ECUs 33 are arranged to be divided between the left and right sides, that is, to be positioned on the driver's seat 5 side and the opposite side to the driver's seat 5.

The wired relay device 20 that is connected to the self-driving-related ECUs 31 is provided on the driver's seat 5 side (right side in FIG. 7) in the left-right direction of the vehicle 1, in a rear portion (rearward on the driver's seat 5 side) in the front-back direction.

The wired relay device 20 that is connected to the HMI-related ECUs 32 is provided in the front portion of the vehicle 1 on the opposite side to the driver's seat 5, such as inside the instrument panel, for example.

The wired relay device 20 that is connected to the travel control-related ECUs 33 is provided in the front portion (frontward on the driver-'s seat 5 side) of the vehicle 1 on the driver's seat 5 side, such as inside the instrument panel, for example.

When each wired relay device 20 is arranged as close as possible to the ECUs that are connected thereto in this manner, it is possible to simplify routing, such as by shortening the wiring length of the ECU wiring 2 connecting the wired relay device 20 and the ECUs.

Because the wired relay device 20 that is connected to the HMI-related ECUs 32 and the wired relay device that is connected to the travel control-related ECUs 33 are arranged to be divided between the left and right sides of the front portion of the vehicle 1, if another vehicle collides with the vehicle from one side of the vehicle, it is possible to reduce the influence of the collision on the wired relay device 20 arranged on the other side.

Variation 1

Figure 8:
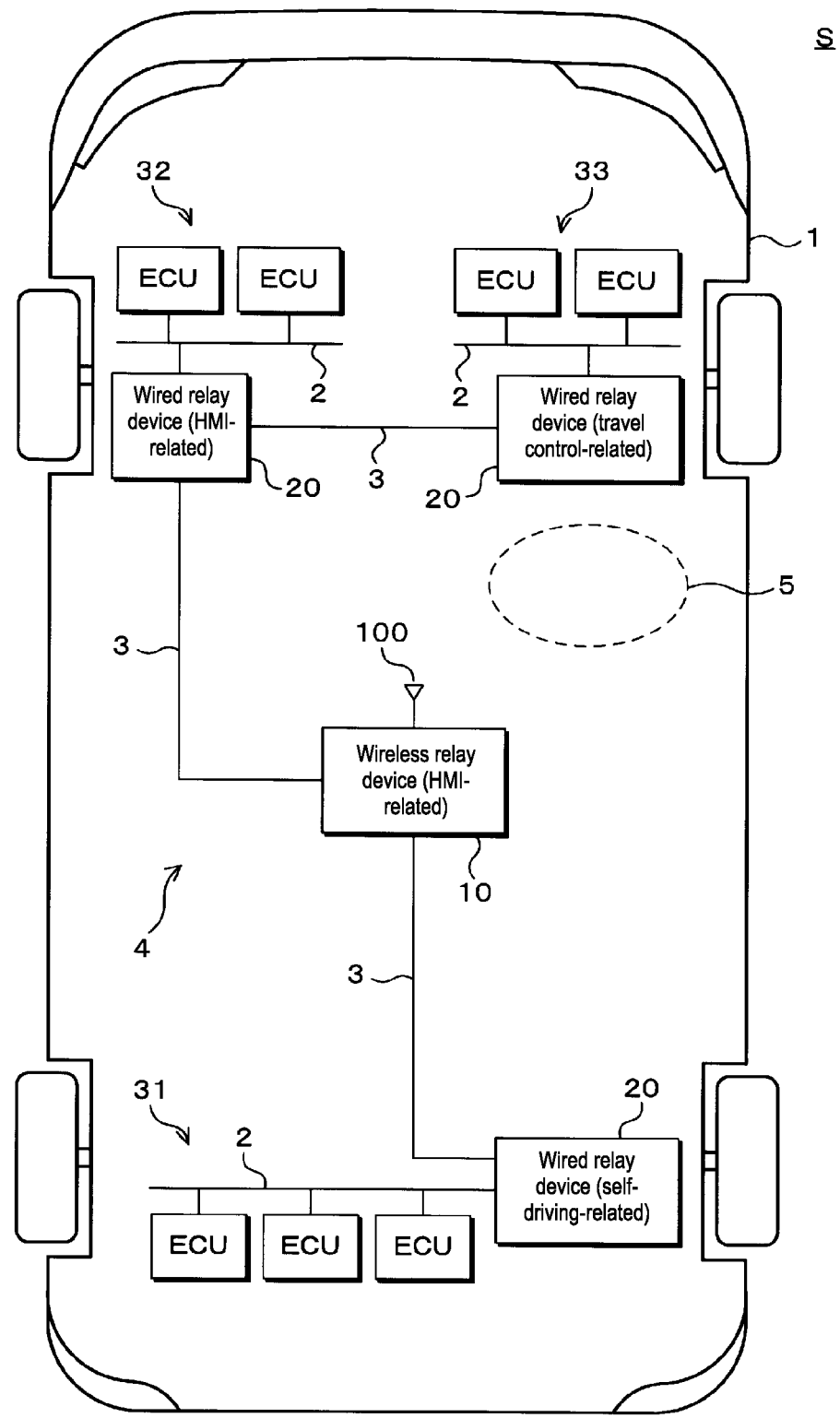
FIG. 8 is a schematic diagram showing a configuration of a relay device system according to Variation 1 (left/right arrangement/in-series connection).
Figure 9:
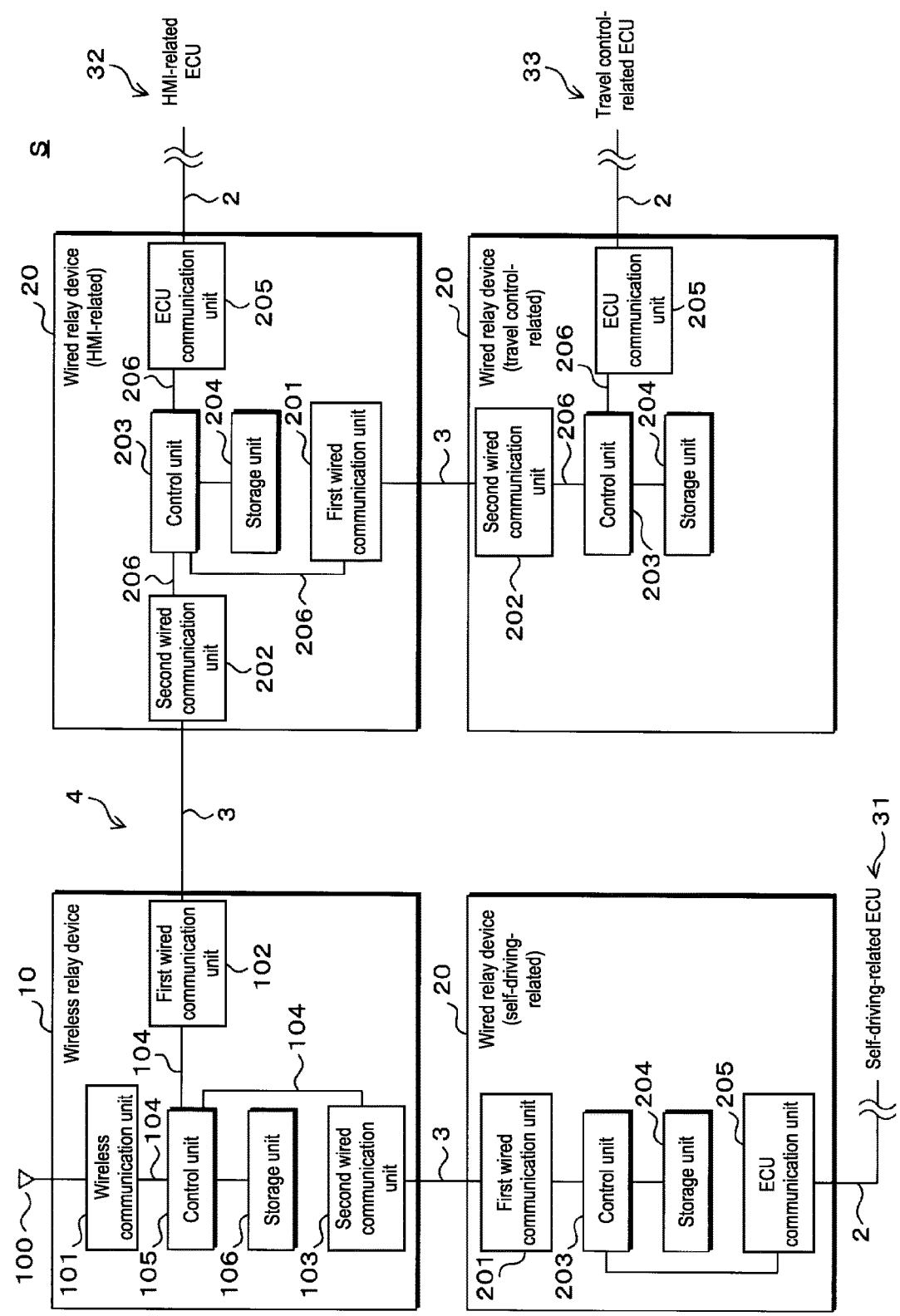
FIG. 9 is a block diagram showing configurations of a wireless relay device and wired relay devices.

FIG. 8 is a schematic diagram showing a configuration of a relay device system according to Variation 1 (right/left arrangement/in-series connection). FIG. 9 is a block diagram showing configurations of a wireless relay device and wired relay devices. Variation 1 differs from Embodiment 1 in that the wireless relay device 10 and the plurality of wired relay devices 20 are connected to each other in series in a relay device system S of Variation 1. That is, although, in Embodiment 1, the ring-like in-vehicle network 4 (ring network topology) is constituted formed due to the wireless relay device 10 and the three wired relay devices 20 being connected to each other via the communication lines 3, there is no limitation thereto. A configuration may be adopted in which the wireless relay device 10 and the three wired relay devices 20 are connected in series by the communication lines 3.

The wireless relay device 10 is directly connected to the wired relay device 20 that is connected to the HMI-related ECUs 32 and the wired relay device 20 that is connected to the self-driving-related ECUs 31. As shown in FIG. 9, the wireless relay device 10 and the wired relay device 20 that is connected to the HMI-related ECUs 32 are directly connected to each other by connecting a first wired communication unit 102 of the wireless relay device 10 and a second wired communication unit 202 of the wired relay device 20 that is connected to the HMI-related ECUs 32 by the communication line 3. The wireless relay device 10 and the wired relay device 20 that is connected to the self-driving-related ECUs 31 are directly connected to each other by connecting a second wired communication unit 103 of the wireless relay device 10 and a first wired communication unit 201 of the wired relay device 20 that is connected to the self-driving-related ECUs 31 by the communication line 3.

The wired relay device 20 that is connected to the travel control-related ECUs 33 and the wired relay device 20 that is connected to the HMI-related ECUs 32 are directly connected to each other by connecting a first wired communication unit 201 of the wired relay device 20 that is connected to the travel control-related ECUs 33 and a second wired communication unit 202 of the wired relay device 20 that is connected to the travel control-related ECUs 33 by the communication line.

Therefore, the wireless relay device 10 and the plurality of wired relay devices 20 are connected to each other in series, with the wired relay device 20 that is connected to the travel control-related ECUs 33 and the wired relay device 20 that is connected to the self-driving-related ECUs 31 as either terminal end, and thus a bus-like in-vehicle network 4 (bus network topology) is formed. The communication made by the wireless relay device 10 and the plurality of wired relay devices 20 that are connected to each other in series is performed by a bucket relay system, for example.

Because the wireless relay device 10 is directly connected to the wired relay device 20 that is connected to the HMI-related ECUs 32 and the wired relay device 20 that is connected to the self-driving-related ECUs 31, even if the communication line 3 connected to one of the wired relay devices 20 is disconnected, the wireless relay device 10 can continue communication with the other wired relay devices 20, and continue the relay of communication between the other wired relay devices 20 and a communication device outside the vehicle.

The wired communication units (the first wired communication unit 201 or the second wired communication unit 202) provided in the wired relay devices 20 located at the terminal ends can be configured as one by connecting the wireless relay device 10 and the plurality of wired relay devices 20 in series, thus simplifying the configuration of the wired relay devices 20 located at the terminal ends.

Although, in this variation as shown in FIG. 8, the wired relay device 20 that is connected to the HMI-related ECUs 32 and the wired relay device 20 that is connected to the travel control-related ECUs 33 are arranged to be divided between the left and right sides of the front portion of the vehicle 1, there is no limitation thereto. When the wireless relay device 10 and the plurality of wired relay devices 20 are connected to each other in series, the wired relay device 20 that is connected to the self-driving-related ECUs 31, the wired relay device 20 that is connected to the HMI-related ECUs 32, and the wired relay device 20 that is connected to the travel control-related ECUs 33 may be arranged toward the driver's seat 5 side, or the opposite side to the driver's seat 5 side.

The embodiments that were disclosed here are to be considered in all aspects to be illustrative and not restrictive. The scope of the present disclosure is defined by the claims and not by the above description, and all changes that come within the meaning and range of equivalency of the claims are intended to be embraced therein.

The invention claimed is:

1. A relay device system to be installed in a vehicle, the relay device system comprising:
   a wireless relay device configured to wirelessly communicate with a communication device provided outside the vehicle; and
   a plurality of wired relay devices that are communicably connected to the wireless relay device,
   wherein the plurality of wired relay devices each include a communication unit configured to communicably connect to an electronic control unit (ECU) for controlling an on-board device installed in the vehicle,
   the ECUs include an human machine interface-related (HMI-related) ECU, a travel control-related ECU, and a self-driving-related ECU,
   the wired relay device that is connected to the HMI-related ECU and the wired relay device that is connected to the travel control-related ECU are arranged in a front portion of the vehicle, and
   the wired relay device that is connected to the self-driving-related ECU is arranged in a rear portion of the vehicle,
   the wireless relay device includes two communication ports for connecting to the wired relay devices, and
   the wired relay device that is connected to the self-driving-related ECU, and the wired relay device that is connected to the HMI-related ECU are directly connected to the wireless relay device respectively via the two communication ports of the wireless relay device.

2. The relay device system according to claim 1, wherein the plurality of wired relay devices are arranged toward the driver's seat side in a left-right direction of the vehicle.

3. The relay device system according to claim 1, wherein the plurality of wired relay devices are arranged toward an opposite side to the driver's seat side in the left-right direction of the vehicle.

4. The relay device system according to claim 1, wherein the wired relay device that is connected to the HMI-related ECU and the wired relay device that is connected to the travel control-related ECU are arranged to be divided between left and right sides of the front portion of the vehicle.

5. The relay device system according to claim 1, further comprising:
   an in-vehicle network formed in a ring by a communication line connecting the wireless relay device and the plurality of wired relay devices,
   wherein the wireless relay device and the plurality of wired relay devices are configured to communicate with each other through the in-vehicle network, using two clockwise and counterclockwise paths.

6. The relay device system according to claim 5,
   wherein the wireless relay device is provided on a roof of the vehicle,
   a portion of the communication line that is directly connected to the wireless relay device is routed inside a front pillar or a rear pillar of the vehicle, and
   the in-vehicle network is formed in a three-dimensional ring.

7. The relay device system according to claim 2, further comprising:
   an in-vehicle network formed in a ring by a communication line connecting the wireless relay device and the plurality of wired relay devices,
   wherein the wireless relay device and the plurality of wired relay devices are configured to communicate with each other through the in-vehicle network, using two clockwise and counterclockwise paths.

8. The relay device system according to claim 3, further comprising:
   an in-vehicle network formed in a ring by a communication line connecting the wireless relay device and the plurality of wired relay devices,
   wherein the wireless relay device and the plurality of wired relay devices are configured to communicate with each other through the in-vehicle network, using two clockwise and counterclockwise paths.

9. The relay device system according to claim 4, further comprising:
   an in-vehicle network formed in a ring by a communication line connecting the wireless relay device and the plurality of wired relay devices,
   wherein the wireless relay device and the plurality of wired relay devices are configured to communicate with each other through the in-vehicle network, using two clockwise and counterclockwise paths.

* * * * *